United States Patent
Zhang et al.

(10) Patent No.: US 7,002,270 B2
(45) Date of Patent: Feb. 21, 2006

(54) GENERATOR ROTOR CONDUCTIVE PATH FOR CONNECTING TO A TOP-TURN OF A WINDING

(75) Inventors: Jiping Zhang, Winter Springs, FL (US); Henk vanRavenswaay, Oviedo, FL (US); William C. Gardner, Rock Hill, NC (US); Peter J. Clayton, Casselberry, FL (US); Larry Zeller, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 217 days.

(21) Appl. No.: 10/738,835

(22) Filed: Dec. 17, 2003

(65) Prior Publication Data

US 2004/0189118 A1   Sep. 30, 2004

Related U.S. Application Data

(60) Provisional application No. 60/437,702, filed on Jan. 2, 2003.

(51) Int. Cl.
    *H02K 3/46*   (2006.01)
(52) U.S. Cl. ......................................... 310/71; 310/270
(58) Field of Classification Search .................. 310/71, 310/270; 439/856, 857
    See application file for complete search history.

(56) References Cited

U.S. PATENT DOCUMENTS

| | | | |
|---|---|---|---|
| 1,588,556 A | 6/1926 | Thomspon | |
| 3,422,213 A | 1/1969 | Webb | |
| 4,204,085 A | 5/1980 | Chapman et al. | |
| 4,368,399 A | 1/1983 | Ying et al. | |
| 4,442,182 A | 4/1984 | Chart | |
| 4,870,308 A | 9/1989 | Sismour, Jr. | |
| 4,955,239 A | 9/1990 | Cage et al. | |
| 5,039,896 A | 8/1991 | Adams et al. | |
| 5,065,059 A | 11/1991 | Adams et al. | |
| 5,122,696 A | 6/1992 | Shih et al. | |
| 5,184,792 A * | 2/1993 | Bernhard et al. | 248/71 |
| 5,280,265 A | 1/1994 | Kramer et al. | |
| 5,358,432 A | 10/1994 | Shih et al. | |
| 6,236,128 B1 | 5/2001 | Dragash, Jr. | |
| 6,424,063 B1 | 7/2002 | Whitener et al. | |
| 6,501,201 B1 | 12/2002 | Whitener et al. | |
| 6,541,888 B1 * | 4/2003 | van Heyden et al. | 310/214 |
| 6,798,101 B1 * | 9/2004 | Tekawade | 310/71 |
| 2003/0057801 A1 | 3/2003 | Zeller et al. | |

* cited by examiner

*Primary Examiner*—Darren Schuberg
*Assistant Examiner*—Leda T. Pham

(57) ABSTRACT

A joined assembly and kit for a rotor of a dynamoelectric machine are provided. The joined assembly is part of a conductive path generally extending from a radially inward section of the rotor to a radially outward section of the rotor. The conductive path includes a flexible connecting member from the radially inward section of the rotor to the joined assembly. The joined assembly includes a stacked winding energizable in response to excitation current carried by the conductive path to a top of the stacked winding located at the radially outward section of the rotor. The joined assembly further includes a connector with a first leg providing an electrically insulated mechanical point of contact relative to a bottom of the stacked winding. A second leg is electromechanically connected to the top of the stacked winding, and a third leg provides an electrically conductive path between the first and the second legs, wherein the stacked winding is captured by the connector to constitute such joined assembly, which is jointly movable in response to axial and/or radial forces that may develop during operation of the dynamoelectric machine.

19 Claims, 3 Drawing Sheets

GENERATOR ROTOR CONDUCTIVE PATH FOR CONNECTING TO A TOP-TURN OF A WINDING

This application claims priority to a provisional application filed on Jan. 2, 2003, having application No. 60/437,702, which is incorporated herein by reference.

FIELD OF THE INVENTION

The present invention relates in general to a lead connecting path for an electric device and, more particularly, to a joined assembly and kit providing a lead connecting path in a generator rotor, as may be used in a power generation plant.

BACKGROUND OF THE INVENTION

Many power generation plants produce electricity by converting various forms of energy (e.g. fossil fuel, nuclear fuel, hydro or wind flow, and geothermal heat) into mechanical energy (e.g. rotation of a turbine shaft), and then converting the mechanical energy into electrical energy (e.g. by the principles of electromagnetic induction).

Some of these power generation plants, such as a fossil-fuel power generation plant, may comprise a turbine, a generator and an exciter. The turbine, generator and exciter are typically coupled to each other in axial alignment, with the generator located between the turbine and the exciter.

The turbine converts fossil fuel energy into mechanical energy in the form of turbine shaft rotation through a steam or combustion cycle. The generator then converts the rotational energy into electrical energy. The generator includes an axially extending rotor journaled in an annular stator that surrounds the rotor. The rotor has a shaft in which conductive coil windings may be axially arranged. The stator has punchings that collectively form an annular core in which conductive coil windings are positioned generally parallel with respect to the axial rotor coils. As the turbine shaft rotates the generator rotor, the exciter provides an electrical current to the rotor coil windings. The rotating electrically excited rotor creates a magnetic flux that induces an electrical current in the stationary stator coil windings. This induced electrical current constitutes the electricity that the power generation plant supplies to consumers of electricity.

One aspect of the foregoing power generation operation involves the electrical interconnection of the exciter and generator. An electrically conductive lead path is used to carry current in a closed loop configuration from the exciter, through the generator rotor coil windings, and then back to the exciter.

It is known that repeated start/stop cycling for generators of large size and weight creates substantial inertial and thermal forces that induce mechanical stresses on the various components of such generators. Components situated at some radial distance from the rotor axis may be subjected to significant centrifugal forces. Such components may include field coils disposed about the rotor and restrained from moving outward away relative to the rotor axis by restraining structures, such as adhesives, coil wedges, retaining rings and other restraining devices.

Electrically connecting structures, traditionally referred to in the art as a J-strap, that connect the field coils to terminals for establishing an electrically conductive lead path to the exciter, for example, may be subjected to the above-described forces, including forces tending to axially and/or radially displace the field coils relative to the rotor each time the generator is started or stopped. Concern has arisen that such connecting structures may become potential weak links in such generators. Lead path failure can cause electric arcing or re-routing of the electric current through nearby conductive materials. Arcing and re-routing can melt portions of the rotor shaft and otherwise damage the generator.

BRIEF DESCRIPTION OF THE DRAWINGS

The advantages of the invention will be more apparent from the following description in view of the following drawings:

FIG. 1 illustrates a known lead conductive path that uses a solid plate for electromechanically interconnecting generator components therein.

DETAILED DESCRIPTION OF THE INVENTION

Figure 1:
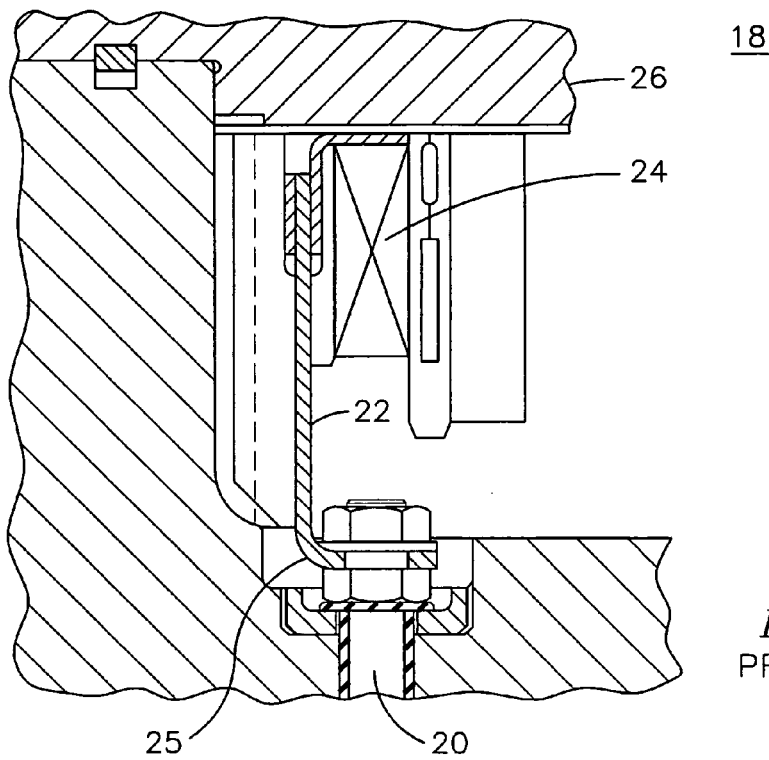
FIG. 1 is a cross-sectional view of an exemplary rotor, as may be used in an electric power generator. More specifically.

FIG. 1 shows part of an exemplary rotor 18, as may be used in an electric power generator. To better appreciate some of the issues solved by the present invention, FIG. 1 illustrates a known lead conductive path comprising a radial lead 20 attached to a solid metallic plate 22. The radial lead 20 carries an excitation current from an exciter (not shown) and the solid metallic plate 22 physically and electrically connects with a coil winding 24.

It has been found that various physical phenomena may cause or tend to cause the conductive path of FIG. 1 to sever or otherwise fail, such as at or near a curved portion 25, e.g., a bottom curved portion. One phenomenon may involve radial forces exerted on the solid plate 22. For example, the radial forces may be caused by radial expansion of a retaining ring 26 during generator start up and operation. Since the radially expanded retaining ring supports at least the winding connected to the solid plate 22, the solid plate also radially expands. This radial expansion may cause various and varying stresses and loads at the solid plate 22.

Another phenomenon may involve axial movement or pivoting of the solid plate 22, which may be caused by thermal expansion of the coil windings during generator start up and/or operation. Since the coil windings commonly have a higher thermal expansion rate than the rotor shaft and are heated by the electric current, coil windings 24 may axially expand relatively faster and to a larger extent than the rotor shaft. This thermal expansion may cause an outboard axial force on the solid plate 22, which is positioned between the coil windings 24 and the rotor shaft and must pivot about the curved bottom portion 25 to allow for the thermally-induced expansion. The terms "inboard" and "outboard" may be used to describe relative location, with the term "inboard" describing a location that is closer to the axial center of the generator rotor length than a location that is "outboard." The foregoing axial expansion, similar to the radial expansion, may cause various and varying stresses, stress concentrations, and loads at the solid plate 22. Moreover, the combined effects of the axial and radial expansions and resulting stresses, stress concentrations and loads may be additive and further compromise conductive path integrity.

Aspects of the present invention provide an improved lead conductive path configured to inhibit or prevent lead path failure that might otherwise develop, for example, at or near the bottom curved bottom portion 25 of solid plate 22. Other aspects of the present invention also provide for such an improved conductive path to be connectable to a top of a stacked winding. In yet other aspects of the present invention, a kit is provided for repairing or retrofitting a field-deployed lead conductive path that has failed or is susceptible to failure with an improved conductive path embodying aspects of the present invention.

Figure 2:
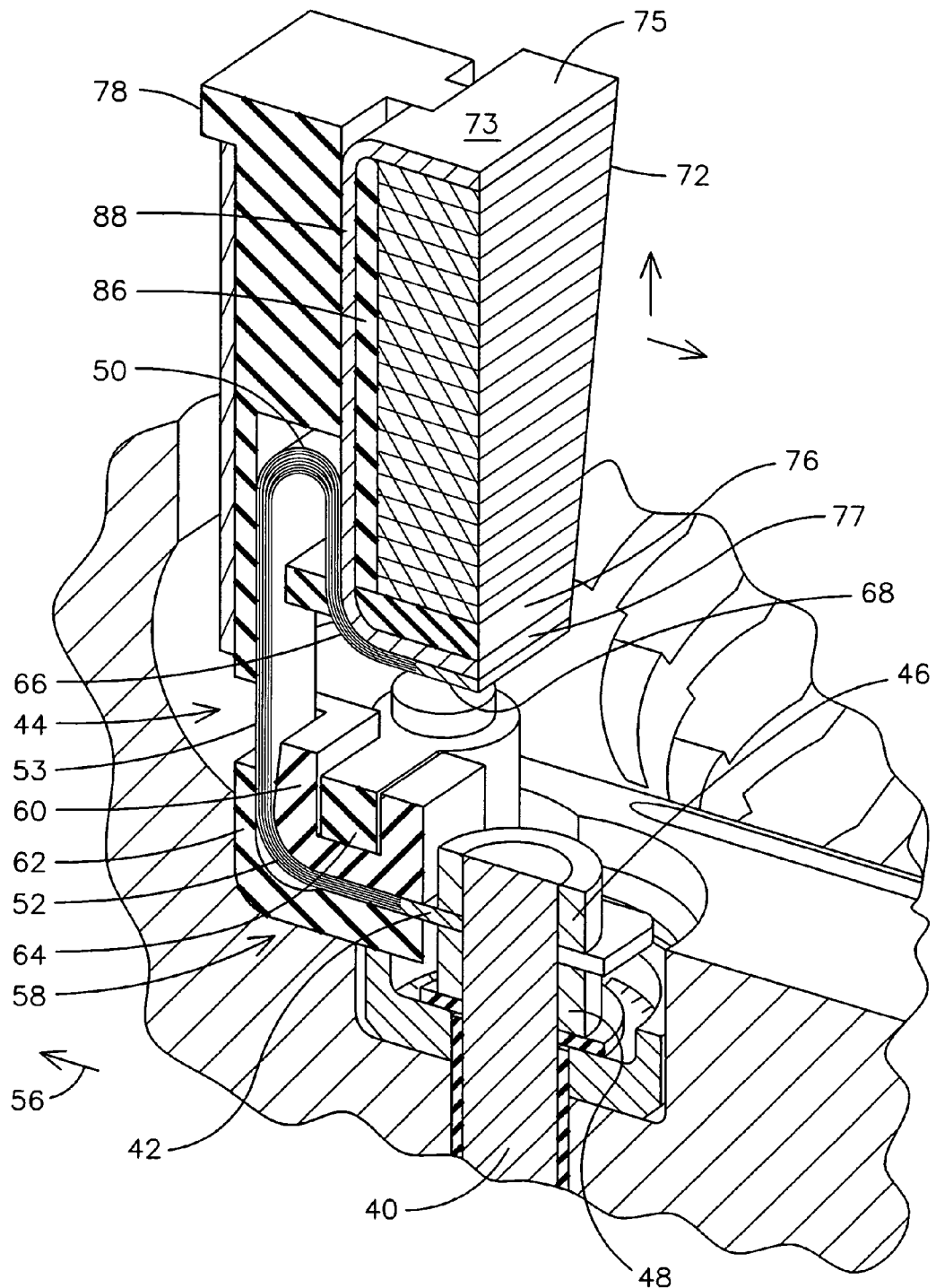
FIG. 2 is a perspective cross-sectional view of an exemplary embodiment of a lead conductive path including a joined assembly embodying aspects of the present invention.

FIG. 2 shows a perspective cross-sectional view of an exemplary embodiment of a lead conductive path embodying aspects of the present invention. The lead conductive path may comprise a radial lead 40 rigidly connected to a first leg 42 of a flexible connecting member 44 through a lead nut 46 affixing the first leg 42 against a support 48. Connecting member 44, e.g., a J-strap, in accordance with aspects of the present invention may be made up of a plurality of electrically conductive leaves, e.g., six or more copper leaves, in lieu of a solid plate. The number and/or thickness of the leaves may vary depending on the electro-mechanical requirements of any given application. For example, the collective cross-sectional of the leaves should be sufficiently large to appropriately carry the exciter current. Another design consideration for selecting the number and/or thickness of the leaves may be the magnitude of the mechanical stresses handled by the connecting member 44. The term "strap" or "J-strap" is not intended to limit connecting member 44 to a J-shaped looped flexible structure, rather, the term "strap" or "J-strap" is used consistent with traditional terminology, as will be understood by those skilled in the art.

Connecting member 44 may be configured to provide an outboard flexible loop 50 (e.g., a loop enabling a 180 degree turn) remote from an inboard curved region 52 of connecting member 44, e.g., inboard curved region 52 is situated between the first leg 42 and a second leg 53 of connecting member 44. First leg 42 extends generally parallel to a rotor axis 56 and is further generally orthogonal relative to the second leg 53. The outboard flexible loop 50 may preferably comprise leaves having a suitable spacing or gap between one another (e.g., such spacing may range from about 0.10 in to about 0.30 in). This inter-leave spacing avoids friction between adjacent leaves at the outboard flexible loop and avoids incremental stress that would otherwise result from interleave friction.

Figure 3:
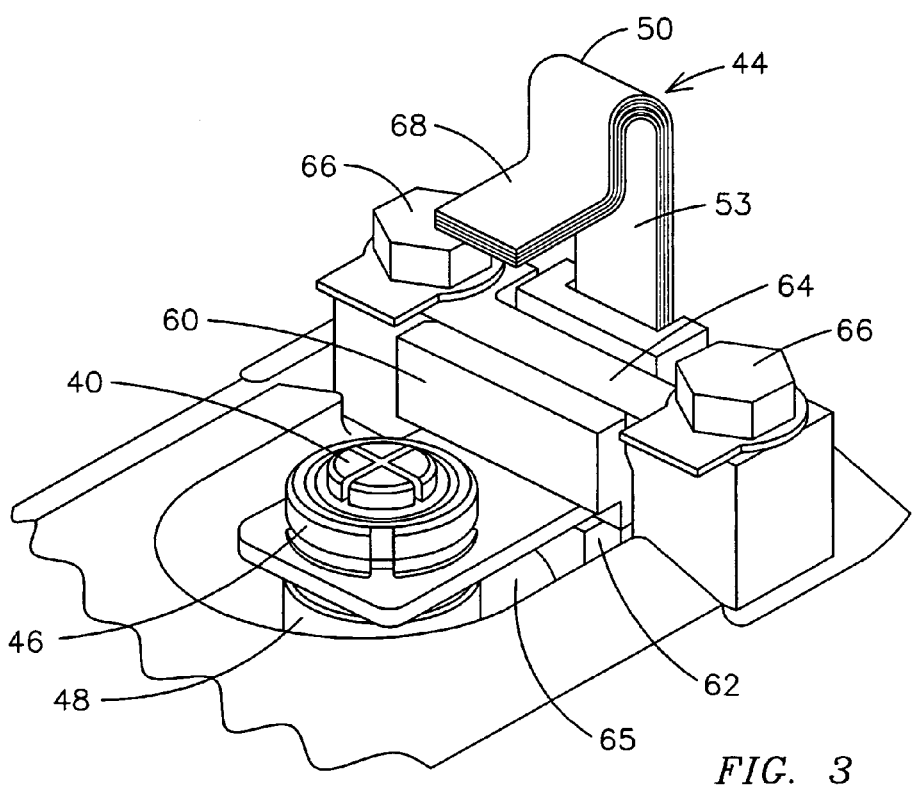
FIG. 3 is an isometric view of the embodiment of FIG. 2.

FIG. 2 further shows a support assembly 58 for supporting curved region 52 of connecting member 44. In one exemplary embodiment, (also seen in the isometric view of FIG. 3) support assembly 58 comprises a first support block 60 (e.g., a top support block), a second support block 62 (e.g., a bottom support block) and a cleat 64 received in a recess across first block 60 and bolted to the rotor shaft through suitable bolts 66 (FIG. 3). It will be appreciated that the top support block 60 provides a restraint to the curved region 52 of connecting member 44 in the presence of outward radial loads as may develop as the rotor is brought to a rotating operational speed (e.g., 3600 RPM). Conversely, the bottom support block may provide a restraint to the curved region 52 of connecting member 44 in the presence of inward radial loads as may develop as the rotor is decelerated to zero-rotation or a low speed condition from the rotating operational speed. The block and cleat components of support assembly 58 comprise electrically insulating materials, such as insulating ceramics to avoid undesirable electrical shorts and/or arcing.

In one exemplary embodiment, the installation of support assembly 58 may require creating a suitable pocket 65 (FIG. 3) in the rotor shaft (e.g., by machining or any other technique suitable to remove material from a metallic body). Pocket 65 may be configured to at least in part accommodate components of support assembly 58, such as the bottom support block 60 and cleat 64. That is, pocket 65 provides space that may be needed to fit some of the components of support assembly 58.

Connecting member 44 further comprises a second curved region 66, e.g., a top curved region between one segment of loop 50 and a third leg 68 of connecting member 44 that extends generally parallel relative to the rotor axis 56. In one exemplary embodiment specifically configured for providing a top-turn winding connection, third leg 68 is electromechanically connected (e.g., through brazing) to a connector 70 (FIG. 4) (e.g., a C-shaped connector or any other connector configuration defining a mouth for capturing a body, such as a stacked winding 72). Connector 70 includes a top leg 73 electromechanically connected to a top 75 of the stacked winding 72. Brazing or any other technique suitable for joining two metallic bodies may provide the connection between the top of the stacked winding and the top leg 73.

Connector 70 and stacked winding 72 in one exemplary embodiment comprise a joined assembly, which is jointly movable in response to axial and/or radial forces that may develop during operation of the dynamoelectric machine. The stacked winding is mechanically supported and electrically shielded by a support block 76, e.g., interposed between a bottom leg 77 of connector 70 and the bottom of stacked winding 72. This avoids electrical contact between connector 70 and the bottom of stacked winding 72. A pole face block 78 may be used for appropriately aligning the stacked winding 72 in a corresponding slot.

Figure 5:
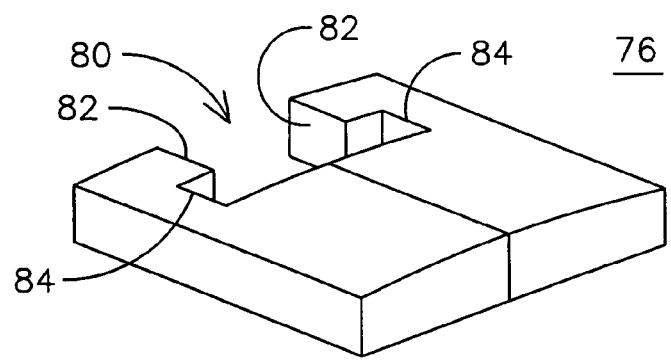
FIG. 5 illustrates an isometric view of a support block that in one exemplary embodiment provides radial support to the joined assembly, and further provides axial and circumferential support to the joined assembly.

FIG. 5 illustrates an isometric view of support block 76 that in one exemplary embodiment is configured to include a window 80 for receiving respective sections of the flexible connecting member 44 and the connector 70. The window in support block 76 is defined at least in part by shoulders 82 adapted to provide axial restraint by the joined assembly within a permissible range of axial displacement. The window in the support block may be further defined by lateral surfaces 84 arranged to provide a clearance between the window and the connecting member in the circumferential direction.

An insulator block 86 may be interposed between a radially-extending leg 88 of connector 70 and stacked winding 72. Leg 88 provides a conductive path between the top and bottom legs 73 and 77 of connector 70. In one exemplary embodiment, leg 88 and top leg 77 of the connector extend co-planarly relative to one another prior to installation of a kit for providing a lead connection from radial lead 40 to the top of the stacked winding. In this embodiment, top leg 77 may be bent at an angle (e.g., 90 deg.) relative to leg 88 during installation of the kit.

The foregoing arrangement may be used when a top-turn winding connection is desired. That is, connector 70 and support block 76 together with connecting member 44 allow providing a top-turn connection to the field winding. It will be appreciated that a bottom-turn connection would not require use of connector 70 and support block 76. Thus, aspects of the present invention advantageously allow configuring an improved lead conductive path to enable a top-turn connection with the addition of just a few components, e.g., connector 70 and support block 76.

Figure 4:
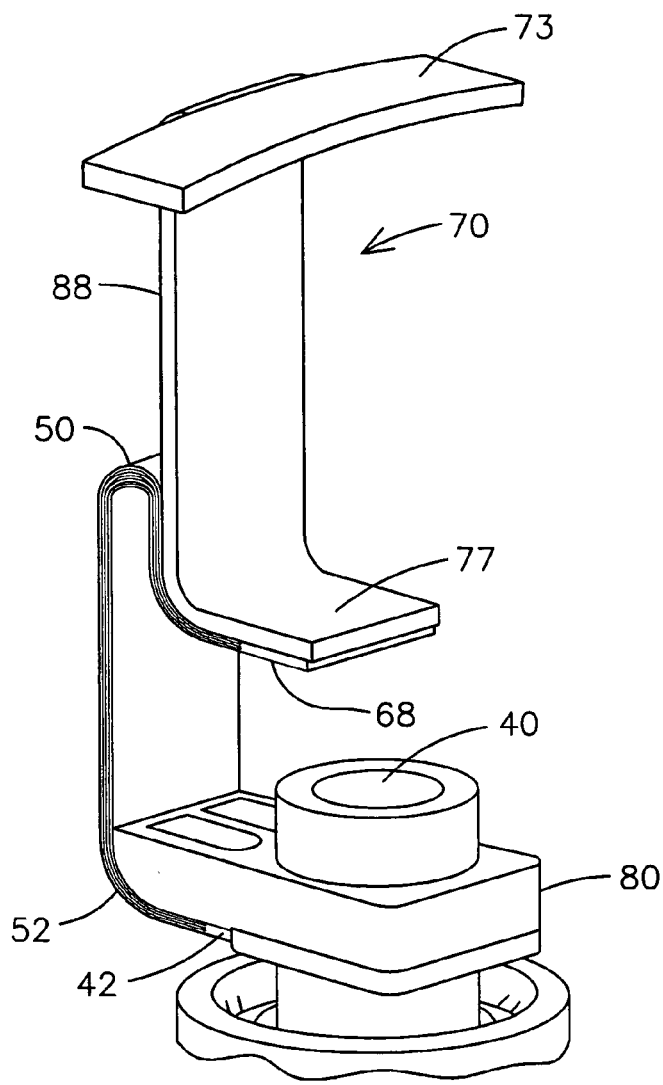
FIG. 4 is an isometric view of another exemplary embodiment of a conductive path embodying further aspects of the present invention.

FIG. 4 is an isometric view of another embodiment of a lead conductive path embodying aspects of the present invention. In this embodiment in lieu of using support assembly 58 made up of various components, a single support plate 80 may be used for rigidly supporting curved region 52 relative to outward radial loads and for affixing the first leg 42 to radial lead 40. This embodiment does not need rotor machining to create a pocket for accommodating some of the components employed by support assembly 58 and may be used in retrofit applications where machining of the rotor shaft may not be practical. This embodiment further does not employ any cleat bolts and associated bolt holes, which may simplify some retrofitting operations and may be conducive to preserve the structural integrity of the rotor. In FIG. 4, stacked winding 72 (FIG. 2) captured by connector 70 and associated blocks have been omitted for simplicity of illustration.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A joined assembly for a rotor of a dynamoelectric machine, said joined assembly being part of a conductive path generally extending from a radially inward section of the rotor to a radially outward section of the rotor, the conductive path including a flexible connecting member from the radially inward section of the rotor to the joined assembly, the joined assembly comprising:
    a stacked winding energizable in response to excitation current carried by the conductive path to a top of the stacked winding located at said radially outward section of the rotor; and
    a connector including a first leg providing an electrically insulated mechanical point of contact relative to a bottom of the stacked winding, a second leg electromechanically connected to the top of the stacked winding, and a third leg providing an electrically conductive path between said first and second legs, wherein said stacked winding is captured by said connector to constitute said joined assembly, which is jointly movable in response to axial and/or radial forces that may develop during operation of the dynamoelectric machine.

2. The joined assembly of claim 1 further comprising a support block interposed between a radially outward surface of the first leg of the connector and the bottom of the stacked winding.

3. The joined assembly of claim 2 wherein said support block comprises an electrically insulating material.

4. The joined assembly of claim 1 wherein a leg of the flexible connecting member is rigidly and electrically connected to a corresponding radially inward surface of the first leg of the connector.

5. The joined assembly of claim 2 wherein said support block is configured to include a window for receiving respective sections of the flexible connecting member and the connector.

6. The joined assembly of claim 5 wherein the window in said support block is defined at least in part by shoulders arranged to provide axial restraint by the joined assembly within a permissible range of axial displacement.

7. The joined assembly of claim 5 wherein the window in said support block is further defined by lateral surfaces arranged to provide a clearance to the joined assembly in the circumferential direction.

8. A kit for a rotor of a dynamoelectric machine, said kit when installed being part of a conductive path generally extending from a radially inward section of the rotor to a radially outward section of the rotor, current carried by the conductive path used for energizing a stacked winding through a top of the stacked winding, said stacked winding located at said radially outward section of the rotor, the kit comprising:
    a connector having a first leg adapted to provide an electrically insulated mechanical point of contact relative to a bottom of the stacked winding, a second leg adapted to be rigidly and electrically connected to the top of the stacked winding, and a third leg adapted to provide an electrically conductive path between said first and second legs; and
    a flexible connecting member having a first leg adapted to be electromechanically connected to a radial lead at the radially inward section of the rotor, the connecting member having a second leg adapted to be electromechanically connected to the first leg of the connector.

9. The kit of claim 8 wherein the second and third legs of the connector extend co-planarly relative to one another prior to installation of the kit.

10. The kit of claim 9 wherein the second leg is bent at an angle relative to the third leg during installation of the kit.

11. The kit of claim 8 wherein said connector is configured to capture the stacked winding.

12. The kit of claim 8 further comprising a support block adapted to be interposed between a radially outward surface of the first leg of the connector and the bottom of the stacked winding.

13. The kit of claim 8 wherein said support block comprises an electrically insulating material.

14. The kit of claim 8 wherein said second leg of the flexible connecting member is rigidly and electrically connected to a corresponding radially inward surface of the first leg of the connector.

15. The kit of claim 12 wherein said support block includes a window adapted to receive respective sections of the flexible connecting member and the connector.

16. The kit of claim 15 wherein the window in said support block is defined at least in part by shoulders adapted to provide axial restraint by the respective sections of the flexible connecting member and the connector within a permissible range of axial displacement.

17. The kit of claim 15 wherein the window in said support block is further defined by lateral surfaces arranged to provide a clearance to the respective sections of the flexible connecting member and the connector in the circumferential direction.

18. The kit of claim 8 wherein said flexible connecting member comprises a plurality of flexible leaves.

19. The kit of claim 18 wherein said flexible connecting member includes a loop configured to be sufficiently flexible along an axial and/or a radial direction to reduce effects of mechanical stresses resulting from said movement on the conductive path.

* * * * *